April 23, 1935.  C. A. SABBAH  1,998,943

GLOW DISCHARGE MEANS FOR TEMPERATURE CONTROL

Filed Oct. 31, 1930

TO HEATING CURRENT SOURCE

Inventor:
Camil A Sabbah,
by Charles E. Tullar
His Attorney.

Patented Apr. 23, 1935

1,998,943

UNITED STATES PATENT OFFICE 1,998,943

GLOW DISCHARGE MEANS FOR TEMPERATURE CONTROL

Camil A. Sabbah, Schenectady, N. Y., assignor to General Electric Company, a corporation of New York Application October 31, 1930, Serial No. 492,586

17 Claims. (Cl. 219—20)

My invention relates to the indication and control of temperature, for example the temperature of a medium within a furnace, and has for its principal object the provision of an improved temperature indicating and controlling system comprising a glow discharge device.

Various temperature responsive devices have been proposed in the past to indicate or control the temperature of a fluid medium, such, for example as the heated air or gas within an electric furnace. In accordance with my invention, changes in the temperature of the medium within such furnaces may be visually indicated and the temperature of the medium may be maintained within small limits, by a simple and effective temperature responsive system in which a glow discharge tube is utilized to produce currents in accordance with the temperature to be indicated and controlled. In this system an intermittent discharge in a glow discharge tube, varying in accordance with changes in the temperature of the heated medium, provides an indication of a drop in temperature within the furnace, and further, forms a switching means to control the flow of heating current to the furnace.

My invention will be better understood from the following description when considered in connection with the accompanying drawing and its scope will be pointed out in the appended claims.

Figure 1:
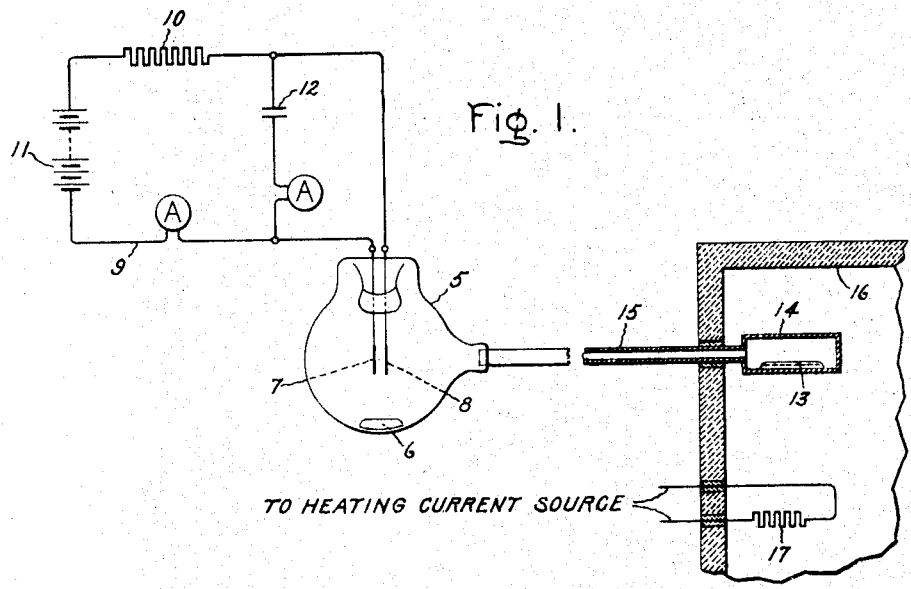
Figure 2:
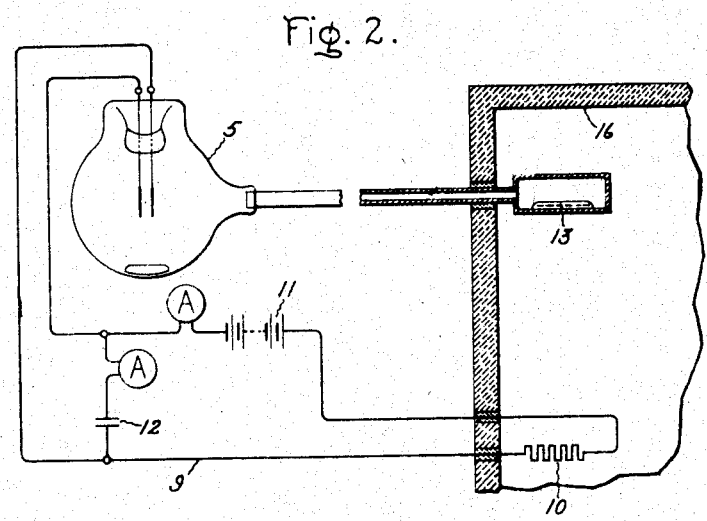

Referring to the drawing, Fig. 1 is a diagrammatic view of a temperature responsive system in accordance with my invention, and Fig. 2 is a diagrammatic view of a temperature responsive system in accordance with the invention, in which temperature control of a medium is effected automatically.

In the embodiment of the invention illustrated in Fig. 1, the temperature responsive system comprises a glow discharge device 5 which is provided for the purpose of producing intermittent glow discharges. This glow discharge device or tube 5, which may be, in certain applications, of relatively small dimensions, for example even of the dimensions of a flashlight bulb, preferably contains neon at a pressure of 7 mm. of mercury, helium at a pressure of 14 mm. of mercury, and mercury vapor supplied from a mercury pool 6 within the tube. In order to produce an oscillatory current in the tube 5, the electrodes 7, 8 are connected in a circuit 9 comprising a 500 ohm resistor 10 and 250 volt current source 11 in series with the electrodes, and a 17 mf. condenser 12 in shunt therewith. The resulting current through condenser 12 is approximately 3 amperes at a frequency of 100 cycles per second. To vary the pressure of the mercury vapor in tube 5 and thereby to control the oscillatory current in circuit 9, a mercury pool 13, sealed in a vessel 14 preferably of metal and connected to the glow discharge tube 5 by a tube 15 also preferably of metal, is arranged to absorb heat from a medium in which temperature changes are to be indicated and the temperature of which is to be controlled. In the present embodiment of the invention heat is supplied to mercury pool 13 from a medium in a container 16 which may be an electric furnace having heating means comprising a resistor or heater 17 supplied with current from a suitable source or may be a chamber derived from an electric furnace with much lower temperature but always proportional to the temperature of the furnace.

It will be understood that when the pressure of the mercury vapor in glow discharge tube 5 is below a given value oscillations occur in circuit 9 and a glow discharge appears between the electrodes 7, 8 in the tube, these oscillations being due to intermittent discharges of the condenser 12 through the tube 5. When, however, the pressure of the mercury vapor in tube 5 becomes greater than that maximum pressure at which a glow discharge will take place between electrodes 7, 8, it will be noted that after the glow discharge is extinguished, as the condenser voltage drops below the maintaining potential, the tube cannot glow again, even though the condenser potential reaches the full potential of source 11, until the pressure of the mercury vapor has gone down to the above stated maximum value. It will be noted further that the mercury vapor pressure in tube 5 is increased when mercury in pool 13 is vaporized by heat transferred thereto from the surrounding medium in container 16. Therefore, in operation of the system shown in Fig. 1, the oscillations in circuit 9 and the accompanying glow discharge in tube 5 when once started will continue until a rise in temperature of the medium surrounding mercury pool 13 causes a rise of pressure in tube 5, due to vaporizing of mercury in pool 13, to a value above that at which the glow discharge may take place. When this value is reached the glow in tube 5 suddenly disappears, indicating that the temperature of the medium in container 16 has risen above the predetermined value. If the heat supply through heater element 17 is then reduced or cut off, the oscillations in circuit 9 and the discharge in glow discharge tube 5 will recommence after a short period, varying, for example, from three to fifteen seconds. The current source which supplies the heating element, resistor 17, may be normally controlled in accordance with the visual indications provided directly by the light of the discharge in glow discharge tube 5 or in accordance with the indications of suitable meters. It will be readily understood that any suitable means operated in accordance with the discharge current in circuit 9 may be utilized to control the heating current which is supplied from the source connected to heating member 17.

An oscillatory discharge in tube 5 is desirable since, during each oscillation, the potential impressed on the tube by condenser 12 drops below the arc maintaining potential, and, therefore, under conditions of rising pressure in the tube the glow is cut off positively at the first oscillation of condenser potential which occurs after the tube pressure has risen to approximately its predetermined maximum value at which a glow discharge in tube 5 may start.

It has been found that by the use of the glow discharge device 5 and its associated circuits in the manner described herein the temperature within the container 16 may be maintained practically constant, varying from a predetermined value by only a small fraction of a degree. It will be understood that the kind and quantity of gas or vapor in glow discharge tube 5 and the length of the tube 15 interconnecting glow discharge tube 5 and the mercury pool 13 are such that the discharge in tube 5 disappears when the temperature of the medium surrounding pool 13 reaches a predetermined maximum value. If the tube 15 is lengthened, thereby adding an appreciable body of gas to that contained in discharge tube 5, the temperature to which the medium surrounding pool 13 must rise in order to produce pressure in tube 5 sufficient to stop the discharge therein is correspondingly higher. If the tube 15 is made relatively short, thereby decreasing the total body of gas in the discharge tube system, the temperature required, in the medium about pool 13, to produce sufficient pressure to stop the discharge is correspondingly lowered. In certain cases the tube length required may be very short, or even may be zero, in which latter case the glow discharge tube 5 itself, containing the mercury pool 6, may function as the vessel 14 having the mercury pool 13 therein and the mercury pool 13 and its container and connecting tube may be omitted.

The embodiment of the invention illustrated in Fig. 2, is similar in general to that illustrated in Fig. 1 but in the arrangement of Fig. 2 the heating means for the medium enclosed by the container 16 includes the resistor 10 forming part of the oscillation circuit 9 described in connection with the system of Fig. 1.

In the operation of the system of Fig. 2, assuming that sufficient heat may be supplied by resistor 10, during periods of oscillation of circuit 9 and of passage of the discharge in glow discharge tube 5, to raise the temperature of the medium in container 16 above a predetermined value, it will be seen that when once started the oscillations in circuit 9, and the accompanying flow of current through the glow discharge tube 5 and the heating element or resistor 10 within container 16, will continue until a rise of temperature in the medium about the mercury pool 13 causes a rise of pressure in tube 5 to a value above that at which the discharge in this tube can occur. When this limiting pressure is reached the glow in tube 5 ceases and with it the heating current in resistor 10. In a few seconds the temperature of the medium surrounding mercury pool 13 drops a fraction of a degree. The vapor pressure in tube 5 drops correspondingly, this vapor pressure drop being sufficient to permit again the initiation of oscillations in circuit 9 and the accompanying flow of current in glow discharge tube 5 and heating member or resistor 10. The cycles of operation and non-operation above described continue alternately and the temperature of the medium in container 16 is therefore maintained, within close limits, at a predetermined value.

The glow discharge tube 5 has been described herein as containing neon and helium in certain proportions and mercury vapor varying in pressure in accordance with heat conditions. It is to be understood, however, that the gas or vapor contents of the discharge device 5 may be varied in quality and quantity for purposes of adjustment to meet varying conditions, it being only necessary, for the purpose of carrying the invention into effect, that means including a vaporizable material, liquid or solid, be arranged to provide the proper vapor pressure in the device 5 to extinguish the glow discharge therein under predetermined temperature conditions.

In case of high current outputs the glow tube may have at least one mercury electrode to bring the cathode drop down to about 20 volts to prevent excessive heating of the tube. If desired the apparatus may also be so arranged that mercury condensed in the tubes may be automatically returned to the containers 14 to maintain a body of mercury therein at all times.

What I claim as new and desire to secure by Letters Patent of the United States, is:

1. The combination of a glow discharge device, means to maintain a discharge in said device after initiation of said discharge due to drop of the gas pressure in said device, said means being operable only at such time as the pressure of the gas within the device has a value substantially equal to a predetermined value and values below said predetermined value, a heat source external to said discharge device, and means dependent upon heat from said source to vary said gas pressure sufficiently to interrupt said discharge in said device at said value substantially equal to a predetermined value, the initiation and the stopping of said discharge being in response only to said varying pressure due to heat from said source.

2. The combination of a glow discharge device containing a vapor, a heat source external to said discharge device, means to maintain a discharge in said device after initiation of said discharge due to drop of the vapor pressure in said device, said means being operable only at such time as the pressure of said vapor within the device has a value substantially equal to a predetermined value and values below said predetermined value, and means responsive to heat from said source to increase the pressure of said vapor from a value at which discharge occurs in said device to a value at which said discharge is prevented, the initiation and the stopping of said discharge being in response only to the variation of said pressure due to heat from said source.

3. The combination of a container, a medium therein varying in temperature, a glow discharge device, means to maintain a periodic discharge in said device after initiation of said discharge due to drop of the gas pressure in said device, said means being operable only at such time as the pressure of the gas within the device has a value substantially equal to a predetermined value and values below said predetermined value, and means dependent on the temperature of said medium to vary said gas pressure over a range including said predetermined value whereby an indication of said temperature is produced, the initiation and the stopping of said discharge being in response only to said varying gas pressure due to variation of temperature of said medium.

4. In a system responsive to the temperature of a medium, a glow discharge device, means to maintain a discharge in said device after initiation of said discharge due to drop of the gas pressure in said device, said means being operable only at such time as the pressure of the gas within said device has a value substantially equal to a predetermined value and values below said predetermined value, and means comprising a vaporizable material heated by said medium for varying said gas pressure in said device over a range including said predetermined value whereby an indication of said temperature is produced, the initiation and the stopping of said discharge being in response only to said varying pressure due to heat from said medium.

5. In a system comprising a medium whose temperature is to be controlled, a glow discharge device having a vapor therein, means external to said discharge device to heat said medium, means to maintain a periodic discharge in said device after initiation of said discharge due to drop of the gas pressure in said device, said last-named means being operable only at such time as the pressure of the gas within the device has a value substantially equal to a predetermined value and values below said predetermined value, and means dependent upon the temperature of said medium to vary said gas pressure sufficiently to interrupt said discharge in said device, the initiation and the stopping of said discharge being in response only to said varying pressure due to heat from said medium.

6. In a temperature control system, a medium, a resistor and a current source connected thereto for heating said medium, a glow discharge device having a vapor therein, means including said resistor and said current source for causing discharges in said glow discharge device, and means comprising material vaporizable by heat from said medium to increase the vapor pressure in said device sufficiently to prevent the occurrence of discharges in said device.

7. In a system for controlling the temperature of a medium, a glow discharge device, a circuit including a resistor and a current source and a condenser for causing the flow of periodic discharge currents in said device, said resistor being in contact with said medium to supply heat thereto due to said discharge currents, said glow discharge device containing a vapor, and material vaporizable to produce additional quantities of said vapor in said device and arranged to be vaporized by heat from said medium to increase the vapor pressure in said device sufficiently to prevent the flow of said periodic discharge currents therein.

8. In a system responsive to the temperature of a medium, a glow discharge device containing mercury vapor, a heater element in contact with said medium, a circuit for causing periodic discharges in said device including said heater element and a current source and a condenser, and a body of mercury arranged to be vaporized by heat from said medium to increase the pressure of the mercury vapor in said device.

9. In a system responsive to the temperature of a medium, a glow discharge device, a circuit for causing periodic discharges in said device including in series therewith a resistor and a current supply source and including a condenser in shunt to said device, means to heat said medium, said glow discharge device containing a vapor, and material vaporizable to produce additional quantities of said vapor in said device and arranged to be vaporized by heat from said medium.

10. In a system responsive to the temperature of a medium, a glow discharge device, a circuit for causing periodic discharges in said device including in series therewith a resistor and a current supply source and including a condenser in shunt to said device, means to heat said medium, said device containing mercury vapor, and a body of mercury arranged to be vaporized by heat from said medium to increase the pressure of the mercury vapor in said device.

11. The combination of a glow discharge device, a heat source external to said glow discharge device, means to maintain a discharge in said device after initiation of said discharge due to drop of the gas pressure in said device, said means being operable only at such time as the pressure of the gas within said device has a value substantially equal to a predetermined value and values below said predetermined value, and means responsive to the heat from said source to increase the pressure of said gas from a value at which discharge occurs in said device to a value at which said discharge is prevented, the initiation and the stopping of said discharge being in response only to the varying pressure of said gas due to heat from said source.

12. The combination of a glow discharge device containing a vapor, a heat source external to said device, means to maintain a discharge in said device after initiation of said discharge due to drop in the vapor pressure in said device, said means being operable only at such time as the pressure of the vapor in said device has a value substantially equal to a predetermined value and values below said predetermined value, and means responsive to the heat from said source to increase the pressure of said vapor from a value at which discharge occurs in said device to a value at which said discharge is prevented, the initiation and the stopping of said discharge being in response only to varying pressure of said vapor due to heat from said source.

13. The combination, in a temperature responsive system, of a space the temperature within which is to be maintained at predetermined values, a vessel containing an attenuated gas having at least a portion arranged within said space, heating means within said space, means to maintain a discharge within said vessel after initiation of said discharge due to drop in the gas pressure in said vessel, said last named means being operable only at such time as the pressure of said gas has a value substantially equal to a predetermined value and values below said predetermined value, and means dependent upon the heat in said space to vary said gas pressure sufficiently to initiate discharge in said vessel, the initiation and the stopping of said discharge being in response only to said varying pressure due to the heat in said space.

14. The combination, in a temperature responsive system, of a space the temperature within which is to be maintained within a predetermined range, a vessel containing attenuated gas having at least a portion arranged within said space, heating means within said space, a pair of electrodes arranged within said gas, means to maintain a discharge between said electrodes after initiation of said discharge due to drop in the gas pressure in said vessel, said last-named means being operable only at such time as the pressure of said gas has a value substantially equal to a predetermined value and values below said predetermined value, and means dependent upon the heat in said space to vary said gas pressure sufficiently to initiate discharge in said vessel, the initiation and the stopping of said discharge being in response only to said varying pressure due to the heat in said space.

15. The combination, in a temperature responsive system, of a space the temperature within which is to be controlled, a glow-discharge device containing an attenuated gas having at least a portion arranged within said space, heating means in said space, and means responsive to pressure of the gas to initiate a succession of discharges in said glow-discharge device to control said heating means.

16. A temperature indicating system comprising a glow discharge device having a plurality of electrodes spaced apart in an attenuated gas and adjusted to break down and pass current only at such time as the pressure of said gas has a value substantially equal to a predetermined value, and means to vary the pressure of said gas in accordance with the temperature to be indicated and over a range sufficient to cause said device to break down whereby an indication of said temperature is produced.

17. A temperature indicating system comprising a glow discharge device having a plurality of electrodes spaced apart in an attenuated gas and adjusted to break down and pass current only at such time as the pressure of said gas has a value substantially equal to a predetermined value, and means to vary the pressure of said gas in accordance with the temperature to be indicated and over a range sufficient to cause said device to break down whereby an indication of said temperature is produced, the initiation and the stopping of the flow of said current being in response only to the variation of said gas pressure due to variation of said temperature.

CAMIL A. SABBAH.

DISCLAIMER 1,998,943.—*Camil A. Sabbah*, Schenectady, N. Y. GLOW DISCHARGE MEANS FOR TEMPERATURE CONTROL. Patent dated April 23, 1935. Disclaimer filed March 22, 1938, by the assignee, *General Electric Company*.

Hereby disclaims claims 1, 2, 3, 4, 5, 9, 10, 11, 12, 13, 14, 15, 16, and 17 of said Letters Patent.

[*Official Gazette, April 19, 1938.*]